United States Patent [19]
Vyletel et al.

[11] Patent Number: 5,492,660
[45] Date of Patent: Feb. 20, 1996

[54] RESIN MOLDING PROCESS UTILIZING A CORE PREPARED FROM GLASS BEADS AND A BINDER

[75] Inventors: Brenda M. Vyletel, Ann Arbor; Carl F. Johnson, Belleville, both of Mich.

[73] Assignee: Ford Motor Company, Dearborn, Mich.

[21] Appl. No.: 283,440

[22] Filed: Aug. 1, 1994

[51] Int. Cl.⁶ .............................. B29C 33/38; B29C 70/30
[52] U.S. Cl. .............................. 264/86; 264/221; 264/257; 264/310
[58] Field of Search .................................. 264/221, 257, 264/317, 86, 310

[56] References Cited

U.S. PATENT DOCUMENTS

| | | | |
|---|---|---|---|
| 4,590,026 | 5/1986 | Goto | 264/221 |
| 4,610,836 | 9/1986 | Wycech | 264/313 |
| 4,695,343 | 9/1987 | Wycech | 264/317 |
| 4,904,423 | 2/1990 | Foreman et al. | 264/221 |
| 5,035,602 | 7/1991 | Johnson | 264/317 |
| 5,089,186 | 2/1992 | Moore et al. | 264/221 |
| 5,126,089 | 6/1992 | Johnson et al. | 264/221 |
| 5,169,590 | 12/1992 | Johnson et al. | 264/257 |

*Primary Examiner*—Robert Davis
*Attorney, Agent, or Firm*—Jerome R. Drouillard; Roger L. May

[57] ABSTRACT

A molded article is prepared by forming a core of glass beads secured together with a binder, inserting the core into a mold, injecting resin into the mold, curing the resin, solubilizing the binder to detach the glass beads from one another, and removing the glass beads from the molded article.

20 Claims, No Drawings

RESIN MOLDING PROCESS UTILIZING A CORE PREPARED FROM GLASS BEADS AND A BINDER

FIELD OF THE INVENTION

This invention relates generally to a resin molding process which utilizes a core prepared from glass beads and a binder. More particularly, the invention is directed to a resin molding process wherein a core formed from glass beads and a binder is inserted into a mold, the resin is injected into the mold thereby at least partially surrounding the core, the molded article is removed from the mold, and the core is removed from the molded article by solubilizing the binder.

BACKGROUND OF THE INVENTION

Many automotive components are made from reinforced and unreinforced plastics. Weight savings are achieved by using hollow cores in the plastic molding processes for making such components. Core elements for such molded parts are generally tubular metal or solid foam thermoplastic materials. Because of the complex shapes of the molded articles and cores used to make automotive components, the cores are generally not removable, and therefore are left encapsulated in the finished molded part. Thus, molders have been motivated to use lighter-weight core materials, to reduce the overall weight of the ultimately produced articles.

U.S. Pat. No. 5,169,590 discloses the use of flexible blow molded thermoplastic cores in resin molding processes. The cores are retained in, and add weight to, the ultimately produced molded parts. The temperatures at which the parts may be molded are limited by the softening temperatures of the thermoplastic cores utilized. Moreover, if the thermoplastic cores are excessively preheated in the molds, lower injection pressures must be used to prevent surface deflection of the core elements.

U.S. Pat. Nos. 4,610,836 and 4,695,343 disclose a method for preparing a reinforced molded article utilizing a structural core comprising adhesively bonded glass macrospheres. The glass macrospheres become adhesively bonded to the molded article to reinforce same. The core is retained in, and adds weight to, the ultimately produced molded part.

It would be desirable to mold plastic components using cores which allow high temperature and/or high pressure molding conditions, while eliminating the added weight of the core material in the ultimately produced molded parts.

SUMMARY OF THE INVENTION

Accordant with the present invention, a process for molding an article has surprisingly been discovered. The process comprises the steps of:

forming a core comprising glass beads secured together with a binder;

inserting the core into a mold;

injecting resin into the mold;

curing the resin to prepare a molded article;

solubilizing the binder to detach the glass beads from one another; and separating the glass beads from the molded article.

The process according to the present invention is particularly well suited for manufacturing fiberglass reinforced structural components for use in vehicles.

DETAILED DESCRIPTION OF THE PREFERRED EMBODIMENT

This invention is directed to a process for molding an article, wherein a core comprising glass beads secured together with a binder is placed into a mold and at least partially encapsulated by resin injected into the mold. Thereafter the core is eliminated from the cured molded article by solubilizing the binder and removing the glass beads.

The core may be formed from commercially available solid or hollow glass beads having nominal diameters, for example, from about 1 mm to about 10 mm. Examples of commercially available glass beads include, but are not necessarily limited to, mullite hollow spheres manufactured by Microcell and soda-lime borosilicate bubbles made by 3M, as well as mixtures of hollow and solid glass beads. The glass beads are secured together by a binder which coats the beads and solidifies to form a rigid core. Suitable binders include, but are not necessarily limited to, sodium silicate, potassium silicate, alumina-based binders such as those having the product designations 795, 902HP, and 989 available from Cotronics Corporation, monoaluminum phosphate, and the like, as well as mixtures thereof. The binders may also include adjuvants such as silica, wollastonite, calcium carbonate, etc., as well as mixtures thereof. A solution of the binder may be prepared by mixing the binder ingredients with conventional water-based or organic liquids.

The core may be formed by placing the glass beads into an enclosed mold having perforated walls (the perforations, of course, must be smaller than the glass beads), then submerging the perforated mold containing the glass beads into a solution of the binder. The walls of the perforated mold must, of course, conform in outline and elevation with the desired shape for the core. Alternatively, glass beads coated with the binder material may be placed into the perforated mold. In order to remove excess binder, to make the core as light-weight as possible, the perforated enclosed mold containing the glass beads with binder may be rotated at several RPM to cause excessive binder to be slung out of the mold through the perforations. The glass beads and remaining binder are maintained in the perforated mold until the core hardens and can be removed therefrom. In some instances, the perforated mold containing the glass beads and binder must be fired, up to temperatures of about 800° F., in order to harden the inorganic binder. Such procedures are well known to those of ordinary skill in the art.

Before the core is inserted into the mold, it optionally may be overlaid with a fibrous reinforcement material such as, for example, glass, ceramic, high temperature organic, or metal fibers. Such fibers may be individual fibers, fiber bundles, woven or nonwoven fabric, braided fibers or fiber bundles, etc., as well as combinations thereof.

Moreover, the core may be preheated to the article molding temperature before it is inserted into the mold. This is a distinct advantage of the core of the present invention over conventionally used foamed organic cores, which generally must be preheated after being placed in a mold due to the thermal expansion and flexing of the organic cores caused by preheating. The core of the present invention may be preheated before being inserted into the mold because it has superior rigidity and dimensional stability relative to conventionally used foamed organic cores.

The core is inserted into the mold in any manner generally used in the molding industry. For example, a mold comprising a pair of apposing dies may be separated and the core positioned within the cavity of one of the mold halves. This method of inserting a core into a mold is set forth in U.S. Pat. No. 5,169,590 which is incorporated herein in its entirety by reference thereto. Alternatively, a plurality of cores may be inserted into the cavity of a single mold. The mold is then closed in preparation for the injection of a resin into the mold cavity.

Resin is injected into the mold by conventional techniques such as, for example, resin transfer molding, reaction injection molding, structural reaction injection molding, etc. The resin may contain chopped fibers of the reinforcing materials mentioned hereinabove. If the core is overlaid with fibrous reinforcement prior to being inserted into the mold, the injected resin will wet out and encapsulate the reinforcement during the injection process. Either thermoplastic or thermoset resins may be used to practice the present invention. A preferred resin comprises a cyclic ester such as a copolymer of polyethylene terephthalate and polybutylene terephthalate, well-known in the industry.

The resin may be injected at much higher temperatures than are conventionally used for injecting thermosetting resins into molds containing foamed or unfoamed organic cores. The core of the present invention can easily withstand injection temperatures in excess of 200° C. (and therefore, lower resin viscosities are experienced during the injection process) and pressures in excess of 500 psi, substantially without experiencing surface deflection. This allows the precise metering of the shot amount at a faster rate while maintaining precise control of the wall thickness of the ultimately produced part.

Depending upon the positioning of the core within the mold, the injected resin may completely encapsulate the core, or the resin may only contact a portion of the surface of the core thereby resulting in a molded article wherein a portion of the surface of the core is exposed.

Following injection of the resin, it is cured to form the molded part. By the term "cure" as it is used herein is also meant the solidification or in situ polymerization of a thermoplastic resin. After the molded part is cured, it may be removed from the mold.

The core is thereafter eliminated from the molded article by solubilizing the binder and removing the glass beads. Where the core is exposed, it may be contacted with a binder solubilizing agent to solubilize the binder; for example, an aqueous acid solution such as aqueous hydrochloric acid (37 weight %, 1.19 SG) may be used to solubilize most inorganic binders. Suitable other acids useful for solubilizing inorganic binders include, but are not necessarily limited to, sulfuric acid, nitric acid, phosphoric acid, acetic acid, and the like, as well as mixtures thereof. The solubilizing agent may flow throughout the core by entering the interstitial spaces between the glass beads. The binder is thereby solubilized, and the glass beads become detached from one another. Where the core is completely encapsulated by the cured resin, a portion of the cured resin must be removed to expose the surface of the core beneath in order to treat the core with the solubilizing agent. This may be accomplished simply by boring one or more holes through the wall of the cured resin article. Thus, the solubilizing agent may be contacted with the core at one or more apertures in the wall of the molded article.

Substantially all of the glass beads are then separated from the molded article by simply pouring them out through the aperture where the core is exposed (some of the glass beads may remain adhered to the molded article). To assist in the separation of the glass beads, the molded article may be shaken or vibrated.

The resultant product according to the present invention is a molded article having a hollow cavity therein of substantially the same size and configuration as the exterior surface of the separated core.

From the foregoing description, one ordinarily skilled in the art can easily ascertain the essential characteristics of the invention and, without departing from the spirit and scope thereof, can make various changes and modifications to the invention to adapt it to various usages and conditions.

What is claimed is:

1. A process for molding an article, comprising:

placing glass beads into a perforated mold;

submerging the perforated mold containing the glass beads into a solution of binder;

removing the perforated mold and binder-coated glass beads from the solution;

rotating the perforated mold to eliminate excess binder solution from the glass beads;

inserting the core into a mold;

injecting resin into the mold;

curing the resin to prepare a molded article;

solubilizing the binder to detach the glass beads from one another; and separating the glass beads from the molded article.

2. The process for molding an article according to claim 1, wherein the glass beads are hollow.

3. The process for molding an article according to claim 1, further comprising firing the binder-coated glass beads to harden the core.

4. A process for molding an article comprising:

forming a core comprising glass beads secured together with a binder, wherein said step of forming the core includes coating the glass beads with a solution of the binder, placing the binder-coated beads into a perforated mold, and rotating the perforated mold to eliminate excess binder solution from the glass beads;

inserting the core into a mold;

injecting resin into the mold;

curing the resin to prepare a molded article;

solubilizing the binder to detach the glass beads from one another; and separating the glass beads from the molded article.

5. The process for molding an article according to claim 4, further comprising firing the binder-coated glass beads to harden the core.

6. The process for molding an article according to claim 1, wherein the core is overlaid with a fibrous reinforcement before it is inserted into the mold.

7. The process for molding an article according to claim 1, wherein the core is preheated before it is inserted into the mold.

8. The process for molding an article according to claim 1, wherein a plurality of cores are inserted into the mold.

9. The process for molding an article according to claim 1, wherein the injected resin contacts only a portion of the surface of the core.

10. The process for molding an article according to claim 1, wherein the binder is solubilized by contacting the core with an aqueous acid.

11. The process for molding an article according to claim 1, wherein the glass beads are separated from the molded article through multiple apertures in a wall of the molded article.

12. The process for molding an article according to claim 1, wherein the molded article is vibrated to assist in separating the glass beads from the molded article.

13. A process for molding an article, comprising:

placing glass beads into a perforated mold;

submerging the perforated mold containing the glass beads into a solution of binder;

removing the perforated mold and binder-coated glass beads from the solution;

rotating the perforated mold to eliminate excess binder solution from the glass beads;

firing the binder-coated glass beads to form a rigid core;

overlaying the core with fibrous reinforcement;

heating the core and fibrous reinforcement;

inserting the core and fibrous reinforcement into a mold;

injecting resin into the mold;

curing the resin to prepare a molded article;

solubilizing the binder to detach the glass beads from one another; and separating the glass beads from the molded article.

14. The process for molding an article according to claim 13, wherein the glass beads are hollow.

15. The process for molding an article according to claim 13, wherein a plurality of cores are inserted into the mold.

16. The process for molding an article according to claim 13, wherein the injected resin contacts only a portion of the surface of the core.

17. The process for molding an article according to claim 13, wherein the binder is solubilized by contacting the core with an aqueous acid.

18. The process for molding an article according to claim 13, wherein the molded article is vibrated to assist in separating the glass beads from the article.

19. A process for molding an article, comprising:

placing hollow glass beads into a perforated mold;

submerging the perforated mold containing the hollow glass beads into a solution of binder;

removing the perforated mold and binder-coated hollow glass beads from the solution;

rotating the perforated mold to eliminate excess binder solution from the hollow glass beads;

firing the binder-coated hollow glass beads to form a rigid core;

overlaying the core with fibrous reinforcement;

heating the core and fibrous reinforcement;

inserting the core and fibrous reinforcement into a mold;

injecting resin into the mold to contact at least a portion of the surface of the core;

curing the resin to prepare a molded article;

solubilizing the binder by contacting the core with an aqueous acid, to detach the glass beads from one another; and separating the glass beads from the molded article while simultaneously vibrating the molded article.

20. The process for molding an article according to claim 4, wherein the core is preheated before it is inserted into the mold.

* * * * *